United States Patent
Smith (10) Patent No.: US 11,522,267 B2
(45) Date of Patent: Dec. 6, 2022

(54) SENSING UNITS INCLUDING A RADIO-FREQUENCY SENSOR, AND RELATED SYSTEMS, DEVICES, AND METHODS

(71) Applicant: Battelle Energy Alliance, LLC, Idaho Falls, ID (US)

(72) Inventor: James A. Smith, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 114 days.

(21) Appl. No.: 17/060,789

(22) Filed: Oct. 1, 2020

(65) Prior Publication Data

US 2021/0126339 A1 Apr. 29, 2021

Related U.S. Application Data

(60) Provisional application No. 62/926,820, filed on Oct. 28, 2019.

(51) Int. Cl.
*H01Q 1/24* (2006.01)
*H01Q 1/22* (2006.01)
(Continued)

(52) U.S. Cl.
CPC ....... *H01Q 1/2208* (2013.01); *G06K 19/0723* (2013.01); *H01F 38/14* (2013.01); *H01Q 7/06* (2013.01); *H01F 2038/143* (2013.01)

(58) Field of Classification Search
CPC ........... G06K 19/0716; G06K 19/0723; H01Q 1/2208; H01Q 1/225; H01Q 1/38; H01Q 7/06; H01F 2038/143; H01F 38/14
See application file for complete search history.

(56) References Cited

U.S. PATENT DOCUMENTS 6,008,533 A * 12/1999 Bruce ............... H01L 23/49531
257/664
6,122,494 A 9/2000 Tuttle
(Continued)

FOREIGN PATENT DOCUMENTS

WO 2015/057504 A1 4/2015
WO 2016/193549 A1 12/2016

OTHER PUBLICATIONS

Liu et al., "A Contactless Polymer Derived Ceramic Temperature Sensing System for Turbine Applications", Florida Center for Advanced Aero-Propulsion (FCAAP)—Annual Technical Symposium 2010, (Aug. 2010) 6 pages.
(Continued)

*Primary Examiner* — Thien M Le
(74) *Attorney, Agent, or Firm* — TraskBritt (57) ABSTRACT

Systems, devices, and methods related to generating and/or transmitting sensor measurement data are described. A device may include a first conductive pad positioned on a first surface of a substrate. The device may also include a second conductive pad positioned on a second, opposite surface of the substrate. Further, the device may include an inductive coil coupled between the first electrical pad and the second electrical pad. Also, the device may include a third conductive pad positioned on a third surface of the substrate and configured to couple to a sensor. The device may include a fourth conductive pad positioned on a fourth surface of the substrate and configured to couple to the sensor. The device may be configured to wirelessly transmit a signal.

19 Claims, 8 Drawing Sheets

(51) Int. Cl.
*H01Q 7/06* (2006.01)
*H01F 38/14* (2006.01)
*G06K 19/07* (2006.01)

(56) References Cited

U.S. PATENT DOCUMENTS

| | | | |
|---|---|---|---|
| 6,294,909 B1* | 9/2001 | Leedy | H01L 21/764 |
| | | | 324/207.17 |
| 8,840,023 B2 | 9/2014 | Chauvet | |
| 9,286,562 B2 | 3/2016 | Forster | |
| 9,378,448 B2 | 6/2016 | Ching et al. | |
| 2006/0032926 A1* | 2/2006 | Baba | H01Q 1/2216 |
| | | | 235/492 |
| 2007/0139976 A1* | 6/2007 | deRochemont | H01C 7/003 |
| | | | 363/17 |
| 2010/0171598 A1 | 7/2010 | Mehring | |
| 2012/0177166 A1* | 7/2012 | Seidel | G21C 17/108 |
| | | | 376/254 |
| 2014/0217183 A1* | 8/2014 | Yosui | G06K 7/10178 |
| | | | 343/702 |
| 2015/0083796 A1 | 3/2015 | Cho et al. | |
| 2016/0064814 A1* | 3/2016 | Jang | H05K 9/0075 |
| | | | 174/377 |
| 2017/0286820 A1 | 10/2017 | Nikunen et al. | |
| 2018/0019054 A1* | 1/2018 | Tenno | H01F 27/2804 |
| 2018/0136167 A1* | 5/2018 | Smith | G01N 29/036 |

OTHER PUBLICATIONS

Smith et al., "Wireless Sensing and Communication Capabilities from In-Core to a Monitoring Center", Idaho Nation Labs Technical Report, INL/EXT-20-59435-Rev000, (Aug. 2020) 58 pages.

* cited by examiner

SENSING UNITS INCLUDING A RADIO-FREQUENCY SENSOR, AND RELATED SYSTEMS, DEVICES, AND METHODS

CROSS-REFERENCE TO RELATED APPLICATION

This application claims the benefit under 35 U.S.C. § 119(e) of U.S. Provisional Patent Application Ser. No. 62/926,820, filed Oct. 28, 2019, the disclosure of which is hereby incorporated herein in its entirety by this reference.

STATEMENT REGARDING FEDERALLY SPONSORED RESEARCH OR DEVELOPMENT

This invention was made with government support under Contract No. DE-AC07-05-ID14517 awarded by the United States Department of Energy. The government has certain rights in the invention.

FIELD

Embodiments of the present disclosure relate generally to sensing units. Yet more specifically, various embodiments relate to radio-frequency identification sensing units including a voltage controlled oscillator.

BACKGROUND

A "sensor" may refer to any type of electronic device capable of sensing (e.g., detecting) one or more characteristics of its environment and providing one or more outputs representing the one or more characteristics. For example, a sensor may sense temperature, pressure, strain, acceleration, chemicals, or any other physical aspect of an environment. In some examples, a sensor output may include data (e.g., analog data, such as a voltage or a current) that represents the value of the one or more sensed characteristics.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Various embodiments disclosed herein relate to a sensing unit configured for converting (e.g., in real-time) an analog voltage and/or a current to a radio-frequency (RF) signal, and wirelessly transmitting the RF signal. More specifically, some embodiments relate to a wireless, passive (e.g., self-powered) sensing unit including a voltage controlled oscillator for receiving an output of a sensor (e.g., any sensor configured to generate a voltage and/or current), and generating a RF signal in response to and based on the output of the sensor. According to some embodiments, the voltage controlled oscillator may include a substrate (e.g., a dielectric material) having a number of conductive pads (e.g., electrodes) coupled thereto.

As will be appreciated, various embodiments may provide for real-time wireless telemetry in various applications. More specifically, according to some embodiments, sensing units, as described herein, may be suitable for various applications, such as automotive (e.g., automotive manufacturing), aerospace, medical (e.g., medical implants), and defense (e.g., ground, ship, and/or air) applications. Further, in some embodiments, as described more fully below, sensing units may be configured for use within harsh environments, such as nuclear reactor environments. Although various embodiments are described herein with reference to nuclear reactor applications, the present disclosure is not so limited, and the embodiments may be suitable in other applications, including those mentioned above, and others.

In the following description, reference is made to the accompanying drawings in which are shown, by way of illustration, specific embodiments in which the disclosure may be practiced. The embodiments are intended to describe aspects of the disclosure in sufficient detail to enable those skilled in the art to make, use, and otherwise practice the invention. Furthermore, specific implementations shown and described are only examples and should not be construed as the only way to implement the present disclosure unless specified otherwise herein. It will be readily apparent to one of ordinary skill in the art that the various embodiments of the present disclosure may be practiced by numerous other partitioning solutions. Other embodiments may be utilized and changes may be made to the disclosed embodiments without departing from the scope of the disclosure. The following detailed description is not to be taken in a limiting sense, and the scope of the present invention is defined only by the appended claims.

In the following description, elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths, and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, e.g., a combination of a DSP and a microprocessor, a plurality of microprocessors, one or more microprocessors in conjunction with a DSP core, or any other such configuration.

Also, it is noted that embodiments may be described in terms of a process that may be depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media include both computer storage media and communication media, including any medium that facilitates transfer of a computer program from one place to another.

It should be understood that any reference to an element herein using a designation such as "first," "second," and so forth, does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Various embodiments of the disclosure are related to sensing units configured to convert one or more sensed parameters (e.g., voltage and/or current) to an RF signal. Further, according to some embodiments, upon converting the one or more sensed parameters (e.g., voltage and/or current) to a RF signal, a sensing unit may wirelessly transmit the RF signal. In some embodiments, a sensing unit may include an RFID sensing unit. Thus, in these embodiments, the sensing unit may convert a sensed parameter to an RF signal and/or wirelessly convey the RF signal in response to receipt of electromagnetic energy from an external RFID transmitter.

As noted above, a sensing unit may include a substrate (e.g., including a dielectric material), an inductive coil, and a number of conductive pads coupled thereto. As will be appreciated, electrical properties of a dielectric material are a function of environmental conditions and/or an applied parameter (e.g., an analog voltage and/or current). For example, as a voltage applied to a dielectric material of a sensing unit changes, a resonant frequency of the sensing unit may change.

Embodiments of the present disclosure will now be explained with reference to the accompanying drawings.

Figure 1:
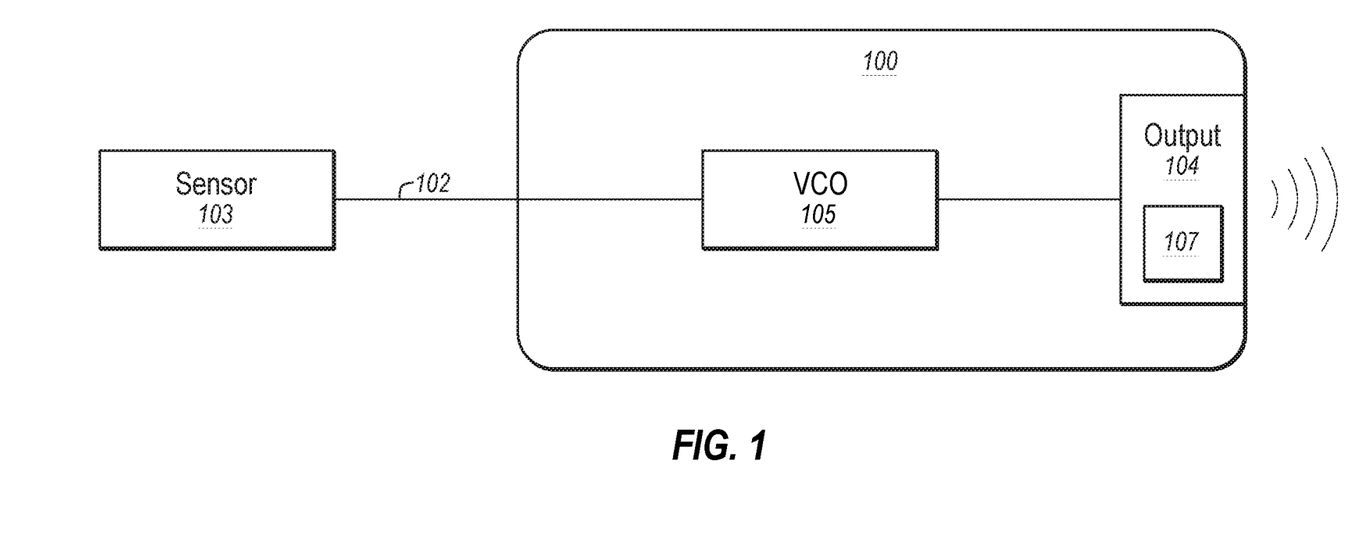
FIG. 1 illustrates an example sensing unit including a voltage controlled oscillator, in accordance with various embodiments of the present disclosure.

FIG. 1 depicts an example sensing unit 100, in accordance with various embodiments of the present disclosure. Sensing unit 100 is configured to receive, via an input 102, a sensor output (e.g., voltage and/or a current) generated by a sensor 103, which is coupled to input 102. Sensing unit 100 and sensor 103 may be collectively be referred to as a "sensing device." Sensing unit 100 further includes a voltage controlled oscillator (VCO) 105 configured to generate a RF signal based on the received sensor output. As described more fully herein, VCO 105 may include a substrate having a number of conductive pads and an inductive coil coupled thereto. An output 104 of sensing unit 100 may include an antenna 107, which may be configured to receive a signal (e.g., a voltage and/or a current) and transmit (e.g., wirelessly) an RF signal.

Figure 2A:
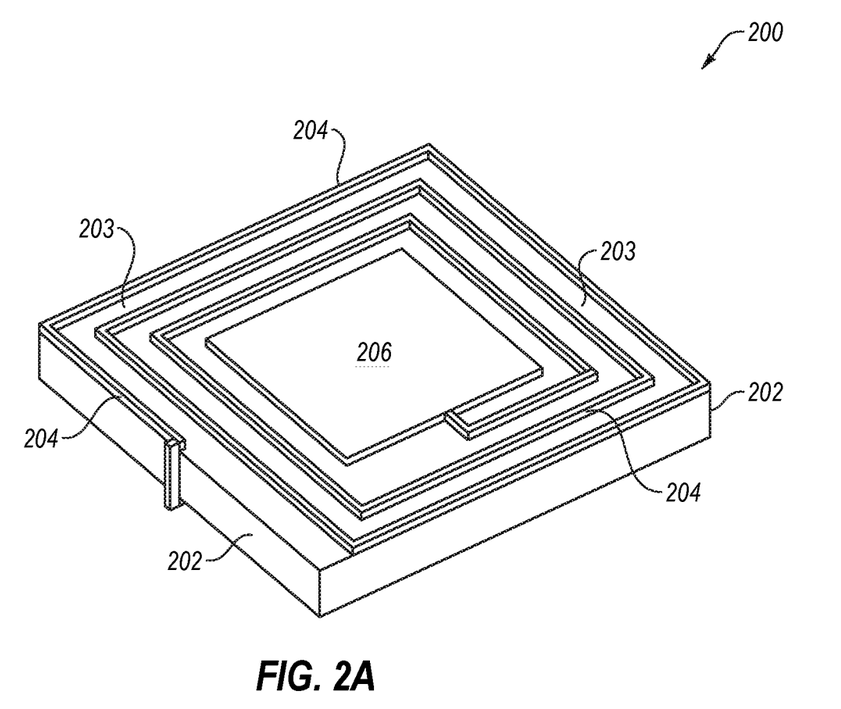
FIG. 2A depicts a radio-frequency sensor including a substrate, an inductive coil, and a conductive pad on a first surface.
Figure 2B:
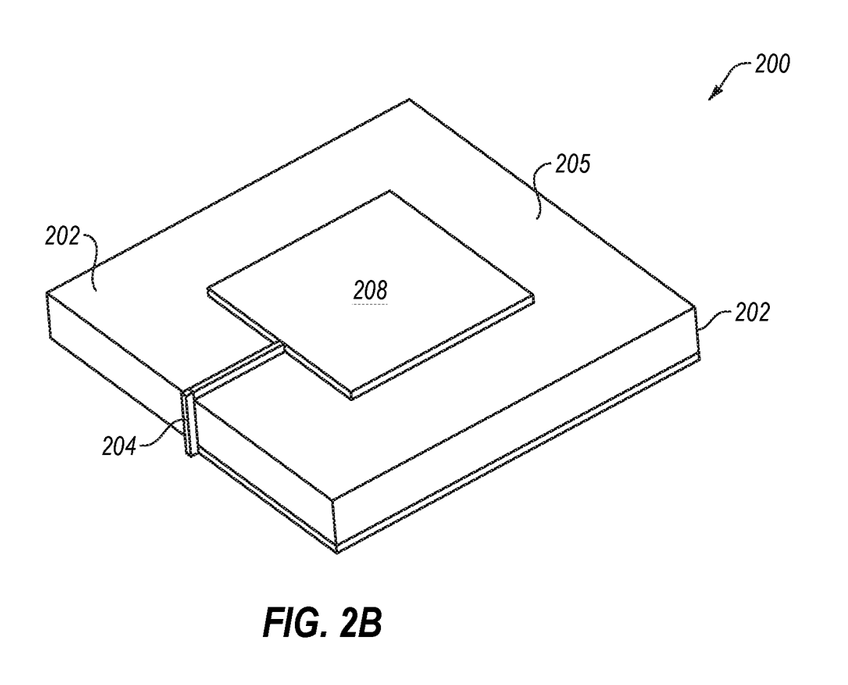
FIG. 2B is another illustration of the radio-frequency sensor of FIG. 2A including another conductive pad on a second, opposite surface.

FIG. 2A depicts a radio-frequency (RF) sensor 200. RF sensor 200 includes a substrate 202 including a surface 203. Substrate 202 may also be referred to herein a "dielectric substrate," a "capacitive substrate," a "capacitive dielectric," or simply a "dielectric." RF sensor 200 further includes an inductive coil 204 and an electrode 206 on surface 203. FIG. 2B is another depiction of RF sensor 200. More specifically, FIG. 2B depicts, for example, a bottom surface 205 of substrate 202, wherein surface 203 (see FIG. 2A) and surface 205 are opposite surfaces. For example, surface 203 may be a top surface and surface 205 may be a bottom surface. As shown in FIG. 2B, surface 205 may include an electrode 208 positioned thereon. Electrode 206 and electrode 208 may be coupled via inductive coil 204. Each of electrode 206 and electrode 208 may also be referred to herein as an "electrical pad" or a "conductive pad." For example, each of electrode 206 and electrode 208 may include a metallic pad. According to some embodiments, electrode 206, electrode 208 and inductive coil 204 may function as an antenna (e.g., antenna 107) for wirelessly receiving an energizing signal and then retransmitting a self-generated modified RF signal. A geometry of an inductive coil (e.g., inductive coil 204) may be modified based on a desired application (e.g., desired frequency).

Substrate 202 may include a dielectric material (e.g., a capacitive dielectric), such as, for example only, polymer derived ceramic (PDC) (SiAlCN), silicon carbide (SiC), and/or silicon nitride (Si$_3$N$_4$). For example, in high temperature environments (e.g., nuclear reactors), substrate 202 may include a PDC, which may be reliable at high temperatures (e.g., up to 1000° C.). A geometry or material composition of substrate (e.g., substrate 202) may be modified based on a desired application (e.g., desired frequency, voltage sensitivity, operating temperature, etc.).

Due to the voltage sensitivity of substrate 202 (e.g., PDC), inductive coil 204 and substrate 202 may modulate the transmitted RF signal in response to changes (e.g., voltage changes) in an output of a sensor (e.g., sensor 103 of FIG. 1) coupled to RF sensor 200. Further, a change in the permittivity of substrate 202 as a function of the output (e.g., a voltage) of the sensor may result in a frequency shift of the electromagnetic signal induced in inductive coil 204. Thus, in at least some embodiments, RF sensor 200 may include a frequency-modulated transmitter. Also, because RF transmission occurs at least in part due to induced currents in substrate 202 from the transmitted excitation signal, RF sensor 200 is inherently self-powered with an extremely long working life.

In at least some embodiments, substrate 202 includes a high resistance dielectric material, and thus a sensor (e.g., a thermocouple) may be directly connected to RF sensor 200, and a voltage at a sensor junction (e.g., thermocouple junction) may be measured without the need for a reference junction.

As noted above, substrate 202 may include PDC, which may exhibit excellent reliability at high temperatures, and excellent temperature response. In at least these embodiments, substrate 202 may provide consistent thermal-resistance responses to temperature as high as, for example, 1000° Celsius, or greater. Further, in at least these embodiments, the repeatability of the thermal-resistance behaviors of substrate 202 may provide for accurate temperature compensation of sensor measurements in different heating-and-cooling cycles (e.g., in a nuclear reactor).

According to some embodiments as described more fully below with reference to FIG. 3, a sensing unit may include an RF sensor (e.g., RF sensor 200 of FIGS. 2A and 2B) including additional conductive pads configured to receive an output from a sensor. For example, one conductive pad may be positioned on a first side surface of substrate 202 of RF sensor 200, and another conductive pad may be positioned one a second, opposite side surface of substrate 202. Further, in some embodiments as described more fully below with reference to FIG. 4, dielectric material may be deposited over the electrodes and/or the inductive coil of an RF sensor (e.g., RF sensor 200 of FIGS. 2A and 2B). In these embodiments, additional conductive pads may be positioned on the dielectric layer (e.g., on top of the electrical pads that are covered by the dielectric material). The additional conductive pads, which may be configured to receive an output from a sensor, are electrically isolated from an inductive coil and/or one or more electrical pads of the RF sensor.

According to some embodiments, the conductive pads may be connected to a source sensor (e.g., thermocouple, pressure sensor, piezoelectric, accelerometer, etc.) via one or more signal channels deposited on the substrate. Further, the signal channels may be connected to an interface that couples to conductors (e.g., wires) of the source sensor. For example, to measure a voltage from a sensor (e.g., a thermocouple), the conductive pads and the connecting conductors may be made from the same material (e.g., the same metals) that form a sensor junction (e.g., thermocouple junction). This may eliminate a need for a reference junction. In this manner, a RFID sensor including a voltage controlled oscillator may be configured to receive and convert analog voltage signals from all types of sensors.

Figure 3:
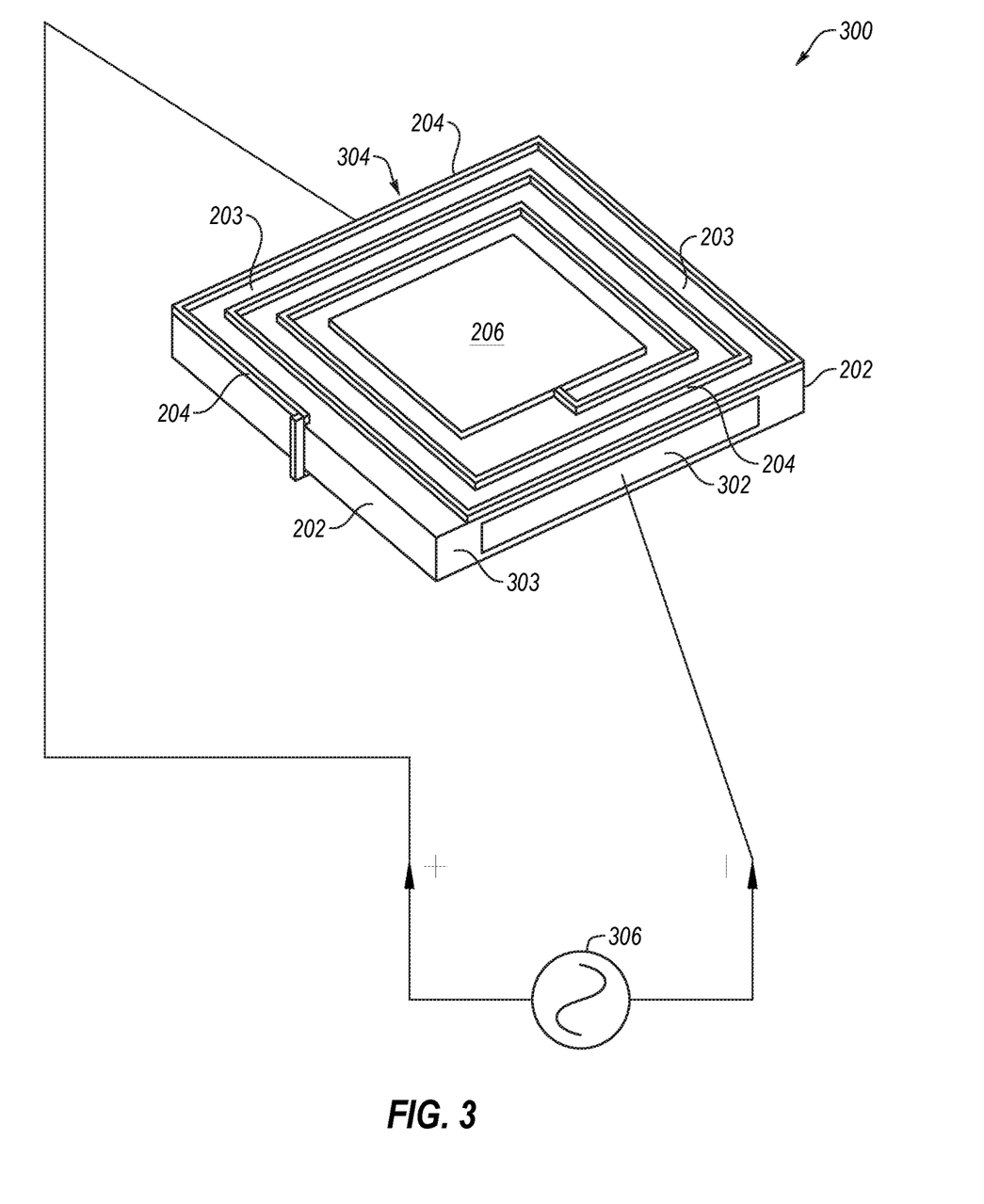
FIG. 3 depicts an example sensing unit including a radio-frequency sensor including a number of conductive pads, in accordance with various embodiments of the present disclosure.

FIG. 3 depicts a sensing unit 300 including substrate 202, inductive coil 204, electrodes 206 and 208 (not shown in FIG. 3; see FIG. 2B), and a number of conductive pads (e.g., electrical pads, such as metallic pads), in accordance with various embodiments of the present disclosure. More specifically, in at least this embodiment, a conductive pad 302 is positioned on a surface (e.g., a side surface) 303 of substrate 202, and another conductive pad (not shown in FIG. 3) is positioned on another surface of substrate 202 (e.g., an opposite side surface), as indicated by reference numeral 304.

Further, according to various embodiments, sensing unit 300 is coupled to a sensor 306, which may include, for example only, a thermocouple, a pressure sensor, a piezoelectric sensor, or a strain sensor. As will be appreciated, a voltage generated by sensor 306 may be applied to sensing unit 300 via conductive pad 302 on surface 303 and the conductive pad on surface 304. As will be appreciated, conductive pads (e.g., including conductive pad 302 and a conductive pad positioned opposite conductive pad 302) may affect substrate 202 in response to receipt of a signal from sensor 306.

Figure 4:
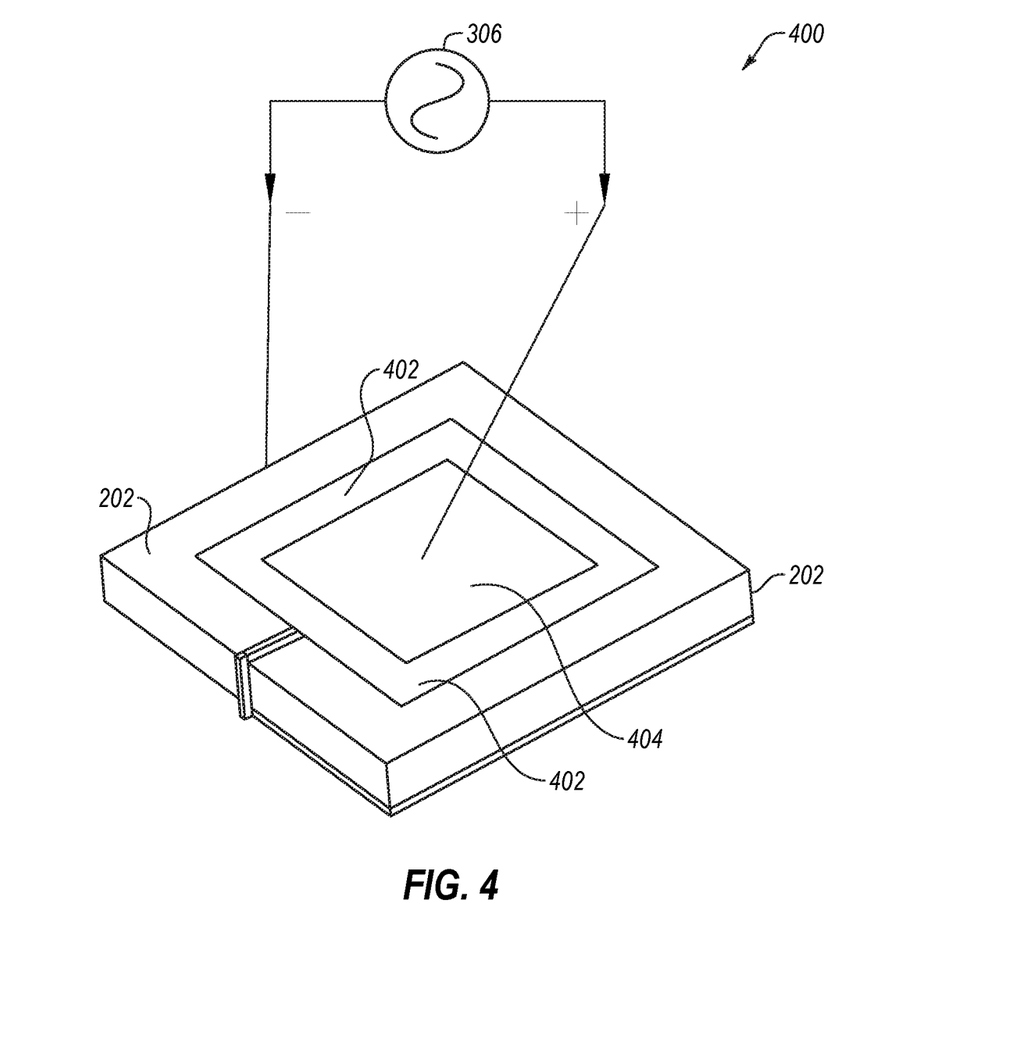
FIG. 4 depicts another example sensing unit including a radio-frequency sensor including a number of conductive pads, according to various embodiments of the present disclosure.

FIG. 4 depicts another sensing unit 400 including substrate 202, inductive coil 204, electrodes 206 and 208 (not shown in FIG. 4; see FIGS. 2A and 2B), and a number of conductive pads, according to various embodiments of the present disclosure. In these embodiments, a dielectric layer 402 is positioned over electrode 208 (see FIG. 2B), and an additional conductive pad 404 is positioned over dielectric layer 402. Further, although not shown in FIG. 4, a dielectric layer is positioned over electrode 206 (see FIG. 2A) and inductive coil 204 (see FIG. 2A), and an additional conductive pad is positioned over the dielectric layer that is positioned over electrode 206. In other words, both electrodes 206/208 and inductive coil 204 of RF sensor 200 are covered with a dielectric layer, and an additional conductive pad is positioned on each dielectric layer. Thus, conductive pad 404 is isolated from electrode 208 via dielectric layer 402, and the conductive pad on the opposite side of substrate 202 is isolated from electrode 206 and inductive coil 204 via dielectric layer.

Further, according to various embodiments, sensing unit 400 is coupled to sensor 306, which, as noted above, may include, for example only, a thermocouple, a pressure sensor, a piezoelectric sensor, a strain sensor, or any other suitable sensor. As will be appreciated, a voltage generated by sensor 306 may be applied to sensing unit 400 via conductive pad 404 and a conductive pad on an opposite surface of substrate (e.g., positioned over inductive coil 204 and conductive pad of electrode 206; see FIG. 2A). As will be appreciated, conductive pads (e.g., including conductive pad 404 and a conductive pad positioned opposite conductive pad 404) may affect substrate 202 in response to receipt of a signal from sensor 306.

Figure 5:
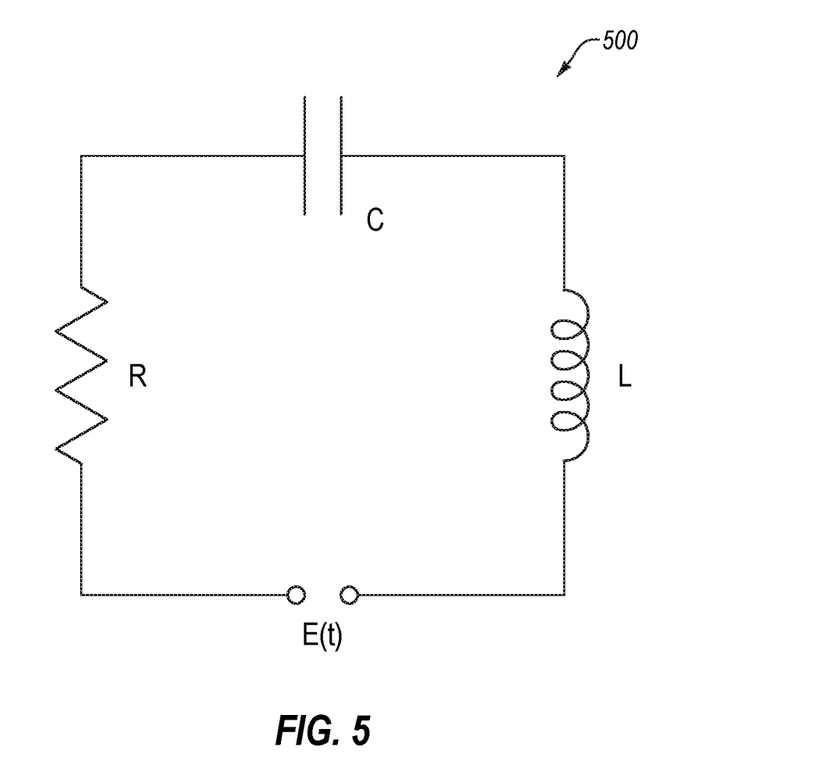
FIG. 5 depicts a circuit of an example sensing unit, in accordance with various embodiments of the present disclosure.

FIG. 5 shows an example RLC circuit 500, according to various embodiments of the present disclosure. RLC circuit 500, which may represent at least some of a sensing unit (e.g., sensing unit 300 of FIG. 3 or sensing unit 400 of FIG. 4), includes a capacitor C, an inductor L, and a resistor R. RLC circuit 500 is configured to receive a voltage E(t) (e.g., from a sensor (e.g., sensor 103 of FIG. 1), such as a thermocouple, a pressure sensor, a piezoelectric sensor, a strain sensor, etc.). Further, RLC circuit 500 may receive electromagnetic energy from an external transmitter/receiver (e.g., an RFID transceiver).

The permittivity ε of substrate 202 (see FIGS. 2A and 2B) is a function of voltage, resulting in the following equation:

$$\varepsilon = \varepsilon(V). \tag{1}$$

Further, the capacitance of RLC circuit 500 is voltage dependent according to the following equation:

$$C = \varepsilon \frac{A}{d}; \tag{2}$$

wherein A is the area of electrical pads 206/208, and d is the distance between electrodes 206 and 208 (i.e., the thickness of substrate 202).

Further, since inductance L is a constant, frequency f of RLC circuit 500 may be expressed as:

$$f = \frac{1}{2\pi\sqrt{CL}}. \tag{3}$$

Therefore, the frequency of an electromagnetic wave generated via RF sensor 200 may change as a function of voltage. For example, this change in frequency may be detected by an RF reader antenna (e.g., positioned within range of a reactor pressure vessel).

As noted above, a sensing unit, as described herein, may be used within various applications, including harsh environment applications, such as nuclear reactor environments. More specifically, for example, a sensing unit may be suitable for use within a fuel capsule inside a nuclear reactor. More specifically, a sensing unit may be configured for real-time monitoring of, for example, temperature and/or pressure inside a fuel rod and/or a test capsule. For example, various embodiments may have broad applications to various testing and/or research programs and/or facilities, such as, but not limited to, Advanced Test reactor (ATR), Nuclear Science User Facilities (NSUF), Gateway for Accelerated Innovation in Nuclear (GAIN), Fuel Cycle Research and Development (FCRD), Material Management and Minimization ($M^3$), and Light Water Reactor (LWR) programs.

As will be appreciated, temperature sensors for nuclear reactor applications may be subject to high temperature, high pressure, and/or oxidation challenges. Although significant advances in sensor design have been made, limitations in durability still exist, and the expense of instrumented test assemblies has increased. Several technology barriers may exist for implementation of wireless sensors into reactor vessels, especially near the core, in high neutron flux regions. Some barriers may be due to the lack of: 1) high temperature durable materials and sensors that can operate up to 1100° C.; 2) radiation hardened materials and electronics; and 3) wireless communication methods compatible with harsh environments. Further, wireless signals encounter attenuation through water and backscatter/noise from a reactor vessel housing. Various embodiments of the present disclosure may address one or more of these shortcomings (e.g., because the traditional voltage producing sensor is placed in the harsh environment that it was originally designed for and the RFID VCO is placed in a more moderate environment).

Figure 6:
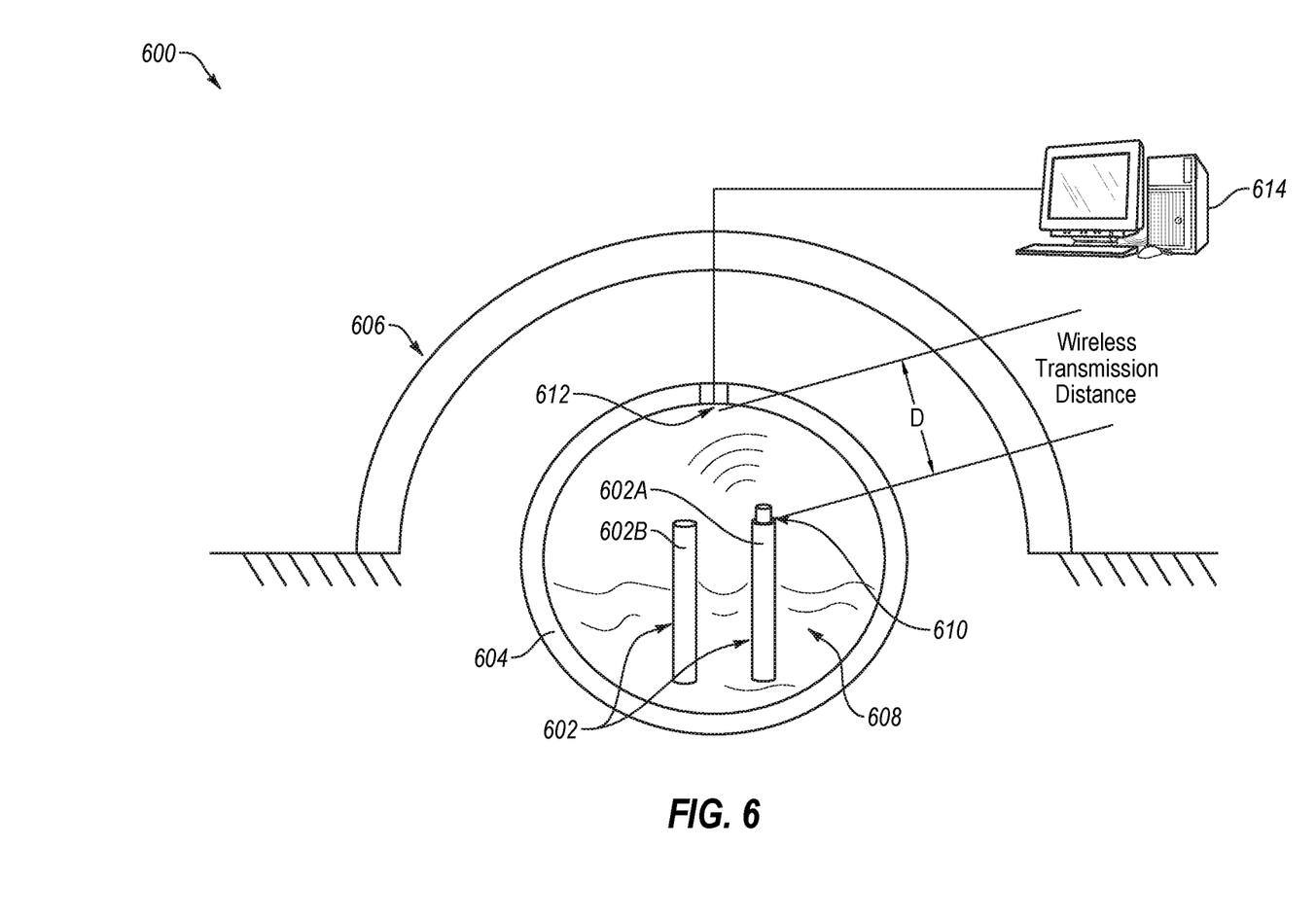
FIG. 6 illustrates an example sensing system including a sensing unit.

FIG. 6 depicts an example sensing system 600, in accordance with one or more embodiments of the present disclosure. For example, sensing system 600 may include a nuclear reactor or a melting plant. Sensing system 600, which may also be referred to as a "sensing environment," includes a number of fuel rods 602 (e.g., fuel rods 602A and 602B) within a container (e.g., steel column container) 604 at least partially surrounded by a shielding (e.g., concrete shielding) 606. Sensing system 600 may include a heater (not shown in FIG. 6; see heater 711 of FIG. 7), such as a resistance heater, to heat coolant 608 within container 604.

Further, sensing system 600 includes a sensing unit 610 positioned adjacent (e.g., attached to) fuel rod 602A. For example, sensing unit 610 may include sensing unit 300 of FIG. 3 or sensing unit 400 of FIG. 4. According to various embodiments, sensing unit 610 may include or may be coupled to a sensor within the harsh environment (e.g., thermocouple, pressure sensor, piezoelectric, strain sensor, etc.; not shown in FIG. 6), and sensing unit 610 may be configured to receive a signal (e.g., a voltage and/or a current) generated by the sensor, and generate an RF signal in response to and based on the signal received from the sensor. Further, sensing unit 610 may be configured to wirelessly send the RF signal to an antenna 612, which may comprise a RF reader antenna. Antenna 612 may further be coupled (e.g., via one or more wires/cables) to RFID sensor reader 614. Sensing unit 610 may be configured to wirelessly transmit the RF signal a distance D (e.g., 20 cm, 30 cm, 40 cm, or another distance less than or greater than 40 cm) to antenna 612. As will be appreciated, sensing unit 610 is a passive device, and thus sensing unit 610 may be energized by an external signal (e.g., external RF signal (e.g., from RFID sensor reader 614 which generates the energizing signal and then receives the modified signal from output 104)). In these embodiments, a transmitted RF signal may be received at sensing unit 610, and a resonant circuit of sensing unit 610 may modify the RF signal and reradiate a modulated RF signal.

Figure 7:
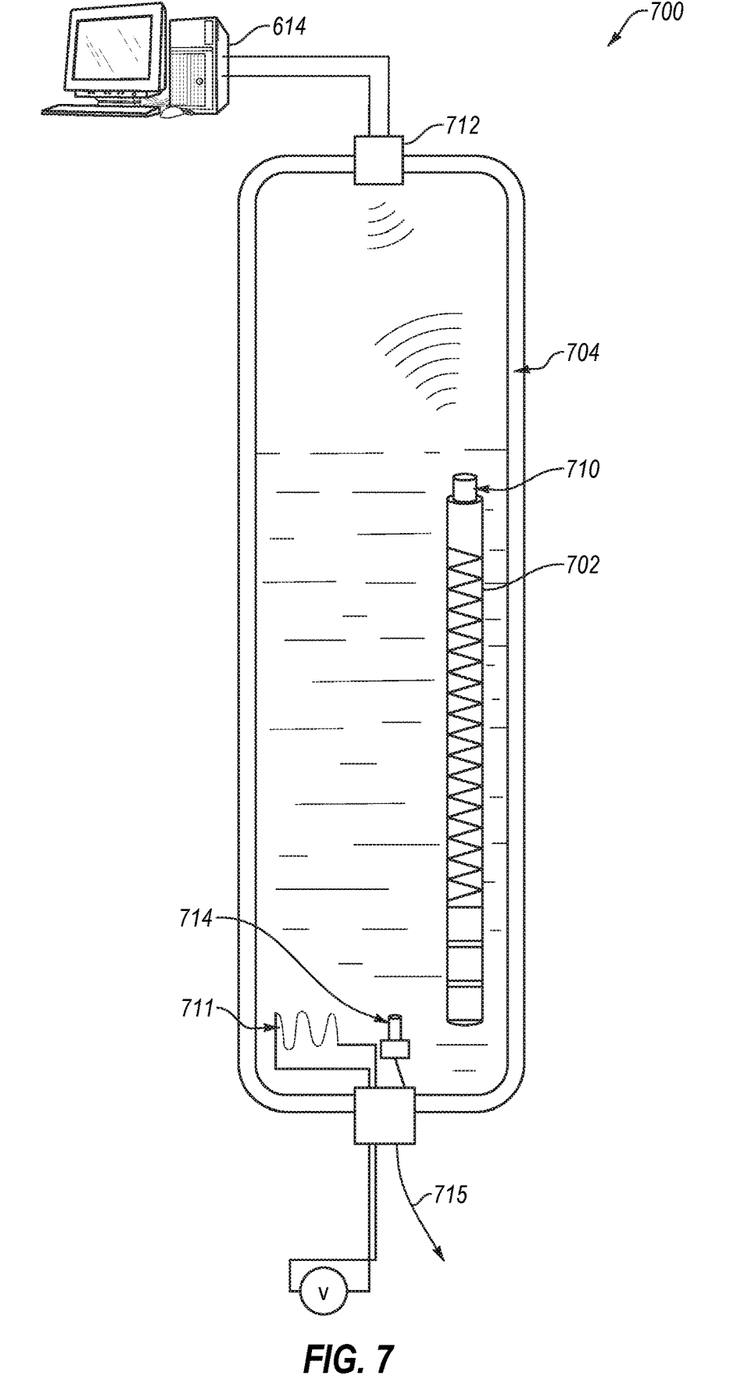
FIG. 7 includes another illustration of an example sensing system including a sensing unit.

FIG. 7 is another illustration of an example sensing system 700, in accordance with one or more embodiments of the present disclosure. Sensing system 700, which may also be referred to as a "sensing environment," includes a fuel rod 702 within a container (e.g., steel column container) 704. Further, a sensing unit 710 may be positioned adjacent (e.g., coupled to) fuel rod 702. For example, sensing system 600 of FIG. 6 may include sensing system 700, and thus, in this example, fuel rod 702 may include fuel rod 602A of FIG. 6, and sensing unit 710 may include sensing unit 610 of FIG. 6. According to various embodiments, sensing unit 710 may be coupled to a sensor within the harsh environment (e.g., thermocouple, pressure sensor, piezoelectric, strain sensor, etc.; not shown in FIG. 7), and sensing unit 710 may be configured to receive a signal (e.g., a voltage and/or a current) generated by the sensor. Further, in at least these embodiments, sensing unit 710 may be configured to convert the received transmitted signal into a modulated RF signal, which may be wirelessly transmitted to a transceiver 712 of sensing system 700. It is noted that neither extreme heat nor pressure may substantially impact the transmission of a signal generated via a sensing unit (e.g., sensing unit 610 or sensing unit 710), therefore ensuring robust sensor measurements. Further, in some embodiments, temperature may affect voltage measurements from the sensor, and thus in these embodiments, RFID VCO measurements may require temperature compensation.

Further, in some embodiments (e.g., a testing environment), sensing system 700 may include a reference sensor (e.g., a reference thermocouple) 714 attached to container 704 such that a reference temperature measurement 715 may be acquired and compared with data generated via sensing unit 710. Furthermore, in various embodiments, transceiver 712 may convey a signal (e.g., electromagnetic energy) that may be received and used by sensing unit 710 (i.e., to power sensing unit 710) to generate a measurement value.

In contrast to current temperature sensing technology (e.g., such as melt wires and silicon carbide bars that reside within the fuel cladding and that are not accessed until cladding is breached after irradiation and cooling periods), various embodiments may provide real-time wireless telemetry. For example, in some nuclear reactor applications, real-time monitoring of fuel may dramatically reduce development time and costs of new fuels. Further, wireless signal transfer may be used to increase operating efficiencies and run-time, and access fuel health under harsh operating conditions (e.g., in commercial power reactors).

Figure 8:
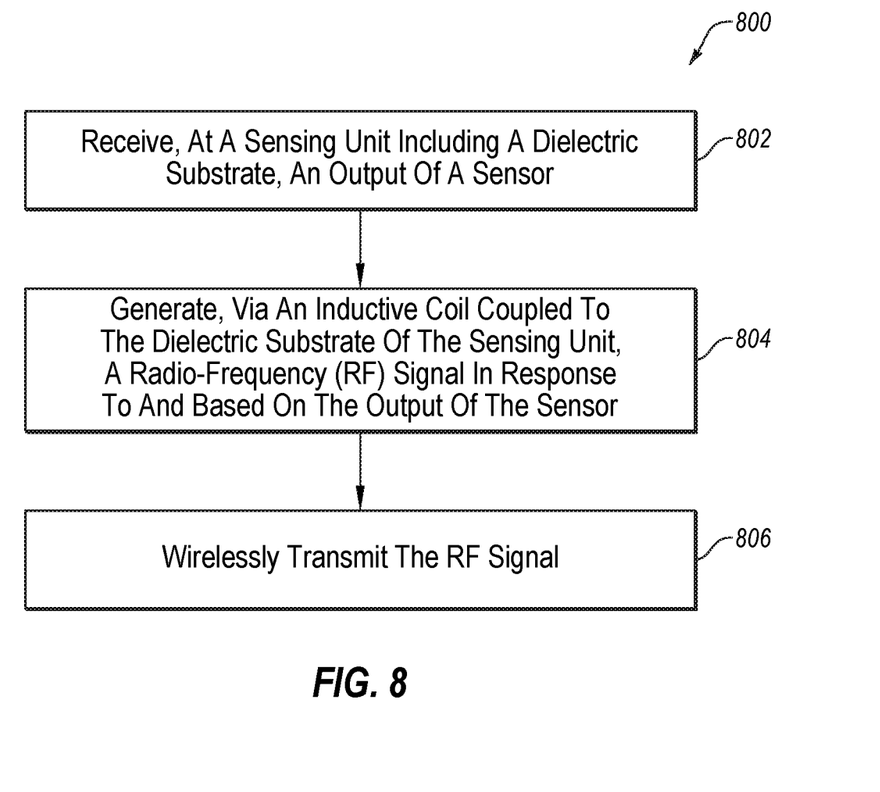
FIG. 8 is a flowchart of an example method of generating and transmitting sensor data, in accordance with various embodiments of the present disclosure.

FIG. 8 is a flowchart of an example method 800 of generating and transmitting sensor data, in accordance with various embodiments of the disclosure. Method 800 may be arranged in accordance with at least one embodiment described in the present disclosure. Method 800 may be performed, in some embodiments, by a device or system, such as sensing unit 100 of FIG. 1, RF sensor 200 of FIGS. 2A and 2B, sensing unit 300 of FIG. 3, sensing unit 400 of FIG. 4, RLC circuit 500 of FIG. 5, sensing system 600 of FIG. 6, sensing system 700 of FIG. 7, or another device or system. Although illustrated as discrete blocks, various blocks may be divided into additional blocks, combined into fewer blocks, or eliminated, depending on the desired implementation.

Method 800 may begin at block 802, where an output of a sensor is received at a sensing unit, and method 800 may proceed to block 804. For example, a voltage and/or current generated by a sensor (e.g., sensor 103 of FIG. 1), such as a thermocouple, a pressure sensor, a piezoelectric sensor, or a strain sensor, may be received at the sensing unit (e.g., sensing unit 100 of FIG. 1 and/or sensing unit 300 of FIG. 3 or sensing unit 400 of FIG. 4).

At block 804, an RF signal may be generated in response to and based on the output of the sensor, and method 800 may proceed to block 806. For example, in response to receipt of the sensor output, the sensing unit (e.g., sensing unit 300 or sensing unit 400) may generate an RF signal. According to various embodiments, a frequency shift of the RF signal may be dependent on an amplitude of the output (e.g., a voltage amplitude) of the sensor (e.g., sensor 103 of FIG. 1).

At block 806, the RF signal may be wirelessly transmitted. For example, an antenna (e.g., antenna 107 of FIG. 1) of the sensing unit may transmit the RF signal, which may be received at an antenna of an RF reader.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, in various embodiments, an RF reader may convey a signal (e.g., electromagnetic energy) that may be received and used by the sensing unit to sense an output of a sensor and generate the RF signal.

It is noted that wireless sensor transmission through water may be performed at various transmission frequencies (e.g., from 1 MHz to 20 GHz, or other frequencies), with an optimal transmission frequency being application specific. Further, water absorption of RF signals may occur at certain wavelengths, while the balance of the frequency spectrum is transmitted at acceptable losses.

In some embodiments, due to the tunability of the frequency response, an array of sensing units may be associated with (e.g., positioned within) individual fuel rods in a reactor core assembly, allowing individual monitoring of the entire core assembly. A real-time, in-core measurement capability fit into non-instrumented test capsules and configured for wireless telemetry (e.g., out of a reactor) may significantly improve fuel testing in reactor applications. Thus, various embodiments disclosed herein may not only enable lower cost, non-instrumented test assemblies, but may also provide a low cost, wireless capability for commercial reactor monitoring of fuel health and safety.

Further, in some embodiments, to identify and/or translate a telemetered RF signal into readable (e.g., computer-readable) data, various operations (e.g., logic operations) may be performed (e.g., via an RF reader) on the RF signal. More specifically, for example, in at least one operation, ultra-high or ultra-low frequency signals may be filtered to pass signals within a designed frequency range. Further, a received RF signal may be converted to a voltage signal, which then may be converted to a discrete signal (e.g., a "0" representing a low voltage level or "1" representing a high voltage level). For example, in at least some embodiments, an RF reader may include an envelope detector configured to filter low frequency signals, a peak detector configured to store a peak energy value of an RFID signal (e.g., via a capacitor), and a comparator configured to output a signal (e.g., a logic 1 or a logic 0) based on a voltage level of a received signal (e.g., in comparison to one or more threshold values).

Various embodiments disclosed herein have broad applications for both nuclear technologies (e.g., R&D of nuclear fuel design and commercial reactors) and other non-nuclear technologies. Further, RF identification, signal processing, and dipole antenna tuning operations described herein are easily adaptable to various sensors types including standard thermocouple sensors, pressure sensors, strain sensors, and any other sensors configured to generate a voltage and/or current (e.g., an analog voltage and/or an analog current signal).

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various detector types and configurations.

What is claimed is:

1. A sensing unit, comprising:
   a substrate;
   a first conductive pad positioned on a first surface of the substrate;
   a second conductive pad positioned on a second surface of the substrate, the second surface opposite the first surface;
   an inductive coil coupled between the first conductive pad and the second conductive pad;
   a third conductive pad positioned a third surface of the substrate and configured to couple to a sensor, the third surface adjacent each of the first surface and the second surface; and a fourth conductive pad positioned a fourth surface of the substrate and configured to couple to the sensor, the fourth surface adjacent each of the first surface and the second surface and opposite the third surface.

2. The sensing unit of claim 1, the substrate comprising one of polymer derived ceramic (PDC), silicon carbide, or silicon nitride.

3. The sensing unit of claim 1, the substrate comprising a dielectric material.

4. The sensing unit of claim 1, wherein the first conductive pad, the second conductive pad, and the inductive coil are configured as an antenna for wirelessly transmitting a RF signal generated in response to receipt of a voltage generated by the sensor and applied to the third and fourth conductive pads.

5. The sensing unit of claim 1, wherein an output of the sensor comprises at least one of a voltage and a current.

6. The sensing unit of claim 1, wherein the sensor comprises at least one of a thermocouple, a piezoelectric sensor, a pressure sensor, an accelerometer, and a strain sensor.

7. The sensing unit of claim 1, wherein the third conductive pad and the fourth conductive pad are coupled to and configured to receive a voltage from the sensor.

8. A method, comprising:
receiving, at a sensing unit including a dielectric substrate, an output of a sensor at a first conductive pad on a first side of the dielectric substrate and a second conductive pad on a second, opposite side of the dielectric substrate;
generating, via an inductive coil coupled between a third conductive pad positioned on a third surface of the dielectric substrate and a fourth conductive pad positioned on a fourth surface of the dielectric substrate, a radio-frequency (RF) signal in response to and based on the output of the sensor being applied to the first and second conductive pads; and
wirelessly transmitting the RF signal.

9. The method of claim 8, wherein wirelessly transmitting the RF signal comprises wirelessly transmitting the RF signal to a radio-frequency identification (RFID) reader.

10. The method of claim 8, further comprising receiving electromagnetic energy at the sensing unit via a radio-frequency identification (RFID) transmitter.

11. The method of claim 8, wherein receiving the output of the sensor comprises receiving at least one of a voltage and a current.

12. The method of claim 8, further comprising:
receiving the RF signal at an antenna; and
conveying the RF signal from the antenna to a radio-frequency identification (RFID) reader.

13. A system, comprising:
a fuel rod;
a sensor attached to the fuel rod; and
a sensing unit coupled to the sensor and comprising a voltage controlled oscillator (VCO) configured to:
receive an output generated by the sensor;
generate a radio-frequency (RF) signal in response to the output; and
wirelessly transmit the RF signal;
wherein the VCO comprises:
a dielectric substrate;
a first conductive pad positioned on a first surface of the dielectric substrate;
a second conductive pad positioned on a second surface of the dielectric substrate;
an inductive coil coupled between the first conductive pad and the second conductive pad;
a third conductive pad positioned on a third surface of the dielectric substrate; and
a fourth conductive pad positioned on a fourth surface of the dielectric substrate.

14. The system of claim 13, wherein the third conductive pad and the fourth conductive pad are configured to receive a voltage from the sensor.

15. A system, comprising:
a dielectric substrate;
a first conductive pad positioned on a first surface of the dielectric substrate;
a second conductive pad positioned on a second, opposite surface of the dielectric substrate;
an inductive coil coupled between the first conductive pad and the second conductive pad;
a dielectric material positioned on: at least a portion of the first surface over the first conductive pad; and at least a portion of the second, opposite surface and over the second conductive pad and at least a portion of the inductive coil;
a third conductive pad positioned on the dielectric material on the first surface; and
a fourth conductive pad positioned on the dielectric material on the second, opposite surface.

16. The system of claim 15, further comprising a sensor coupled to each of the third conductive pad and the fourth conductive pad.

17. The system of claim 15, wherein the third conductive pad and the fourth conductive pad are configured to receive at least one of a voltage and a current from a sensor.

18. The system of claim 17, wherein the sensor comprises at least one of a thermocouple, a piezoelectric sensor, a pressure sensor, an accelerometer, and a strain sensor.

19. The system of claim 15, wherein the first conductive pad, the second conductive pad, and the inductive coil are configured as an antenna for wirelessly transmitting a RF signal generated in response to receipt of a voltage generated by a sensor and applied to the third and fourth conductive pads.

* * * * *